United States Patent
Su et al.

(10) Patent No.: US 8,786,893 B2
(45) Date of Patent: Jul. 22, 2014

(54) PRINTING APPARATUS, METHOD AND SYSTEM FOR PREVIEWING PRINTING

(75) Inventors: Guan-I Su, New Taipei (TW); Tien-I Kao, New Taipei (TW); Hsien-Chung Chen, New Taipei (TW)

(73) Assignees: Cal-Comp Electronics & Communications Company Limited, New Taipei (TW); Kinpo Electronics, Inc., New Taipei (TW)

( * ) Notice: Subject to any disclaimer, the term of this patent is extended or adjusted under 35 U.S.C. 154(b) by 74 days.

(21) Appl. No.: 13/584,797

(22) Filed: Aug. 13, 2012

(65) Prior Publication Data

US 2013/0088753 A1    Apr. 11, 2013

(30) Foreign Application Priority Data

Oct. 5, 2011   (TW) .............................. 100136120 A (51) Int. Cl.
G06K 15/02    (2006.01)

(52) U.S. Cl.
USPC ........................................ 358/1.16; 358/1.15

(58) Field of Classification Search
USPC .............................................. 358/1.15, 1.16
See application file for complete search history.

(56) References Cited

U.S. PATENT DOCUMENTS

| 2012/0026555 A1* | 2/2012 | Mizoguchi | .................. 358/3.28 |
| 2012/0050797 A1* | 3/2012 | Tamura | ........................ 358/1.15 |
| 2012/0050806 A1* | 3/2012 | Fukuda | ......................... 358/1.15 |
| 2013/0163052 A1* | 6/2013 | Yamaguchi et al. | ......... 358/1.15 |

FOREIGN PATENT DOCUMENTS

| TW | I280040 | 4/2007 |
| TW | 200725333 | 7/2007 |

* cited by examiner

*Primary Examiner* — Qian Yang (74) *Attorney, Agent, or Firm* — Jianq Chyun IP Office (57) ABSTRACT

A printing apparatus, a method, and a system for previewing printing are provided. The provided method includes receiving a printing job; determining whether the printing job includes a preview printing command; storing a printing data when the printing job includes the preview printing command; printing the printing data; when the printing job is determined to include the preview printing command, determining whether to continue executing the printing job; and when it is determined to continue executing the printing job, continuing to print the printing data. Thus, after the printing data is printed, a user can directly review the printing quality when he or she is beside the printing apparatus, and the user can continue to execute the printing job.

15 Claims, 8 Drawing Sheets

```
@PJL JOB NAME="NEW_TEXTFILE.TXT"
@PJL SET USERNAME=USER001
@PJL SET PREVIEW=ON
IMAGE DATA:0x00, 0x11, 0xff, 0x88 · · ·
 · · · · · · · · · · · · · · · · · · ·
 · · · · · · · · · · · · · · · · ·
@PJL EOJ
```

User01:     User02:     User03:
0x01-DOC1   0x11-IMG1   0x21-PDF1    70
0x01-DOC2   0x12-IMG2
            0x13-IMG3

PRINTING APPARATUS, METHOD AND SYSTEM FOR PREVIEWING PRINTING

CROSS-REFERENCE TO RELATED APPLICATION

This application claims the priority benefit of Taiwan application serial no. 100136120, filed on Oct. 5, 2011. The entirety of the above-mentioned patent application is hereby incorporated by reference herein and made a part of this specification.

BACKGROUND OF THE INVENTION

1. Field of the Invention

The invention relates to a preview printing technique. More particularly, the invention relates to a system, a printing apparatus, and a method for previewing printing.

2. Description of Related Art

As the information society pervades, there are printing apparatuses including printers and multi-functional peripherals in offices, and users may perform secretarial processing operations with use of these printing apparatuses. A preview printing function that allows the users to preview one or more documents to be repeatedly printed has gradually become a basic and necessary function.

A process for previewing printing via a printing apparatus includes following steps. A user selects to execute a preview printing program at the computer end and can then preview the simulated image on the screen of the computer in advance. The user then prints one document for confirmation, and after confirming the printed document, the user further performs setting in association with subsequent printing of more documents. Therefore, the user using the preview printing function must first print one document for quality control and further perform setting on the computer in order to subsequently print more documents.

The user is thus burdened with the repetitive actions of standing next to the printing apparatus to confirm the quality of the printed document and then performing setting on the computer for printing more documents. Moreover, when the user previews a simulated image on the screen, the additional watermark is generated by the driver, and thus the actual watermark cannot be correctly displayed on the screen. Additionally, one of the concerns is raised by the output color quality affected by the aging machine, the wasted material, or the chromatic aberration on the screen.

SUMMARY OF THE INVENTION

The invention is directed to a system, a printing apparatus, and a method for previewing printing; by applying the invention, the issue of confirming quality of printed document and then performing setting on a computer for subsequently printing other documents can be effectively resolved.

The invention provides a method for previewing printing. The method is suitable for a printing apparatus and includes following steps. A printing job that includes a printing data is received. Whether the printing job includes a preview printing command is determined. When the printing job is determined to include the preview printing command, the printing data is stored. The printing data is printed. When the printing job is determined to include the preview printing command, whether to continue executing the printing job is determined. When it is determined to continue executing the printing job, the printing data continues to be printed.

According to an embodiment of the invention, the method for previewing printing further includes following steps. When the printing job is determined to include the preview printing command, a work index value for indexing the printing data is established according to a user, and the work index value is stored into a work index table. When the printing data is printed, and the printing job is determined to include the preview printing command, the user is identified, the work index value is selected from the work index table according to the user, and the printing data is read based on the work index value.

According to an embodiment of the invention, before continuing to print the printing data, the method for previewing printing further includes setting parameters that can be spontaneously adjusted by a printer. Here, the parameters include the number of copies, color density, or a margin of the printing data.

The invention further provides a printing apparatus for previewing printing. The printing apparatus includes an input/output (I/O) module, a printing module, a storage module, and a parser module. The I/O module receives a printing job that includes a printing data. The printing module prints the printing data. The storage module stores the printing data. The parser module determines whether the printing job includes a preview printing command. When the printing job is determined to include the preview printing command, the printing apparatus stores the printing data. After the printing module prints the printing data, the printing apparatus determines whether to continue executing the printing job. When it is determined to continue executing the printing job, the printing apparatus continues to print the printing data.

According to an embodiment of the invention, the printing apparatus further includes an identification module that identifies a user based on identification information. When the printing job is determined to include the preview printing command, the printing apparatus establishes a work index value according to the user and stores the work index value into a work index table in the storage module. Here, the work index value is used for indexing the printing data. When the printing data is printed by the printing module, and the printing job is determined to include the preview printing command, the identification module identifies the user, the printing apparatus selects the work index value from the work index table according to the user, and reads the printing data based on the work index value.

According to an embodiment of the invention, before the printing module continues to print the printing data, the printing apparatus further sets parameters that can be spontaneously adjusted by a printer. Here, the parameters include the number of copies, color density, or a margin of the printing data.

The invention further provides a system for previewing printing. The system includes a computer device and a printing apparatus. A driver is installed in the computer device, and the driver issues a preview printing command. The computer device transmits a printing job that includes a printing data and the preview printing command. The printing apparatus includes an I/O module, a printing module, a storage module, and a parser module. The I/O module receives the printing job. The printing module prints the printing data. The storage module stores the printing data. The parser module determines whether the printing job includes the preview printing command. When the printing job is determined to include the preview printing command, the printing apparatus stores the printing data. After the printing module prints the printing data, the printing apparatus determines whether to continue executing the printing job. When it is determined to continue executing the printing job, the printing apparatus continues to print the printing data.

According to an embodiment of the invention, the printing apparatus further includes an identification module that identifies a user based on identification information. When the printing job is determined to include the preview printing command, the printing apparatus establishes a work index value according to the user and stores the work index value into a work index table in the storage module. Here, the work index value is used for indexing the printing data. When the printing data is printed by the printing module, and the printing job is determined to include the preview printing command, the identification module identifies the user, the printing apparatus selects the work index value from the work index table according to the user, and reads the printing data based on the work index value.

According to an embodiment of the invention, before the printing module continues to print the printing data, the printing apparatus further sets parameters that can be spontaneously adjusted by a printer. Here, the parameters include the number of copies, color density, or a margin of the printing data.

Based on the above, when the printing job is determined to include the preview printing command, the printing apparatus stores the printing data and prints the printing data. After the user confirms the quality of the printing data which is printed, and when the user determines to continue executing the printing job, the user may set printing parameters via a panel of the I/O module in order to continue to print the printing data. Thereby, the printing apparatus can be equipped with the actual preview printing function and allows the user to check the watermark of the printing data while he or she is beside the printing apparatus. As such, the issue that the watermark cannot be displayed on the screen can be resolved, and the user is no longer burdened with the repetitive actions of standing around the printing apparatus to confirm the quality of the printed document and then moving back to the computer to perform setting at the computer end for printing more documents. Moreover, the applications of the invention can be extended by the identification module that can identify users, so as to accomplish multiple functions and ensure user identity confidentiality.

Several exemplary embodiments accompanied with figures are described in detail below to further describe the invention in details.

BRIEF DESCRIPTION OF THE DRAWINGS

The accompanying drawings are included to provide a further understanding of the disclosure, and are incorporated in and constitute a part of this specification. The drawings illustrate exemplary embodiments of the invention and, together with the description, serve to explain the principles of the invention.

DETAILED DESCRIPTION OF DISCLOSED EXEMPLARY EMBODIMENTS

Descriptions of the invention are given with reference to the exemplary embodiments illustrated with accompanied drawings, wherein same or similar parts are denoted with same reference numerals. Moreover, elements/components/notations with same reference numerals represent same or similar parts in the drawings and embodiments.

Figure 1:
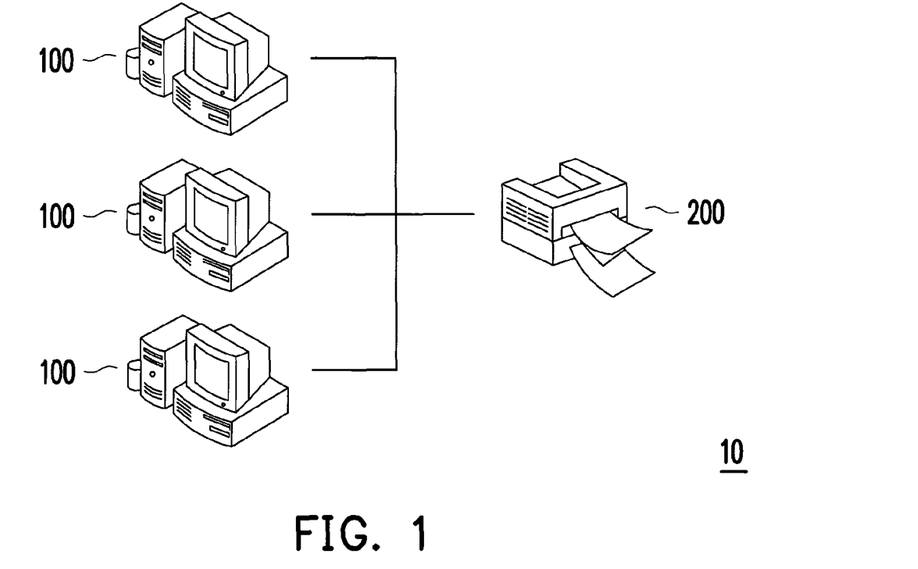
FIG. 1 is a schematic view illustrating a system for previewing printing according to an embodiment of the invention.

FIG. 1 is a schematic view illustrating a system 10 for previewing printing according to an embodiment of the invention. With reference to FIG. 1, the system 10 includes a computer device 100 and a printing apparatus 200. The computer device 100 is a desktop/laptop computer that is equipped with a preview printing function, for instance. The printing apparatus 200 may be any type of printing apparatus, e.g., a laser printer, an inkjet printer, a multi-functional peripheral, and so on.

Figure 2:
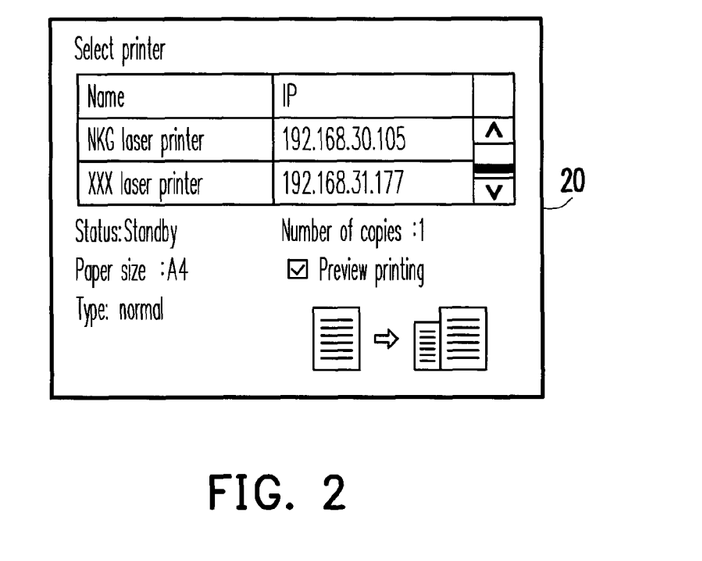
FIG. 2 is a schematic view illustrating a screen indicating execution of a driver according to an embodiment of the invention.

When a user needs to preview document to be printed, the user must install a driver having a previewing printing function in the computer device 100. When the user executes the driver, the image exemplarily shown in FIG. 2 can be displayed on the screen, and the image contains a "select printer" option, the status of the printer, paper size, file type, the number of copies, and a preview printing option. A driver is installed in the computer device 100, and thus the driver issues a preview printing command when the user selects the preview printing option. The computer device 100 then transmits a printing job to the printing apparatus 200, and the printing job includes a printing data and the preview printing command. The printing data may be a word file, a text file, an image file, an excel file, or any other type of files, which should not be construed as a limitation to the invention.

Figure 3:
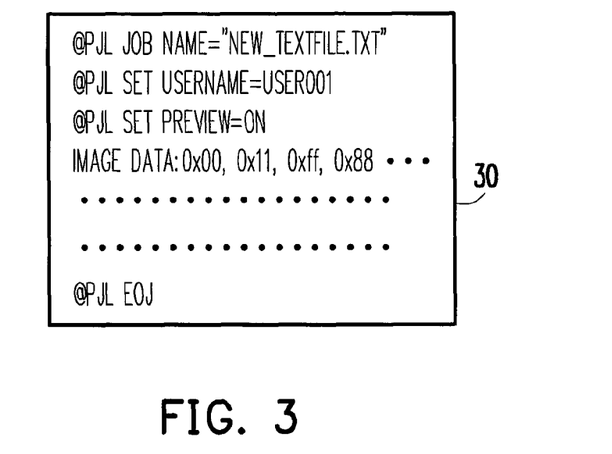
FIG. 3 is a schematic view illustrating a command file according to an embodiment of the invention.

FIG. 3 is a schematic view illustrating a command file 30 according to an embodiment of the invention. With reference to FIG. 3, the driver may generate a plurality of commands, e.g., a command for naming the printing job, a command for setting a user's name, a command for setting a preview printing function, and so on. Here, "@PJL JOB NAME="NEW_TEXTFILE.TXT" refers to the command for naming the printing job and indicates that the job name is "NEW_TEXTFILE.TXT" when the printer job language (PJL) is applied as a common printer protocol. "@PJL SET USERNAME=USER001" refers to the command for setting a user's name and indicates that the user's name is set as USER001 under the PJL protocol. "@PJL SET PREVIEW=ON" refers to the command for setting a preview printing function and indicates that the preview printing function is set to be ON under the PJL protocol. The PJL provided above should not be construed as a limitation to the invention.

Figure 4:
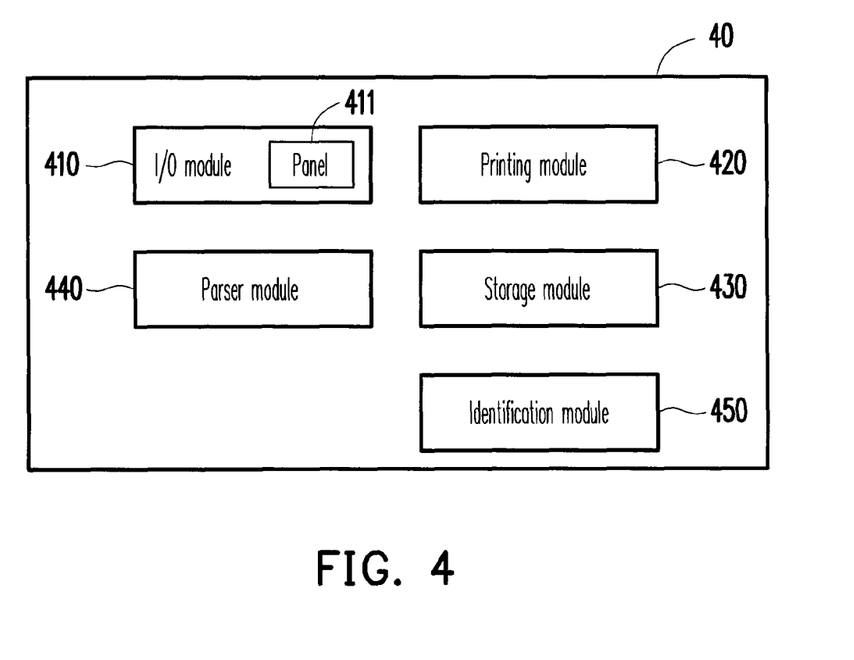
FIG. 4 is a block diagram illustrating a printing apparatus for previewing printing according to an embodiment of the invention.

FIG. 4 is a block diagram illustrating a printing apparatus 40 for previewing printing according to an embodiment of the invention. With reference to FIG. 4, the printing apparatus 40 includes an I/O module 410, a printing module 420, a storage module 430, a parser module 440, and an identification module 450. The I/O module 410 receives the printing job transmitted by the computer device 100. The printing module 420 mainly prints the printing data of the printing job. The storage module 430 stores the printing data. The parser module 440 determines whether the printing job received by the I/O module 410 includes a preview printing command. The identification module 450 identifies a user based on identification information.

Figure 5:
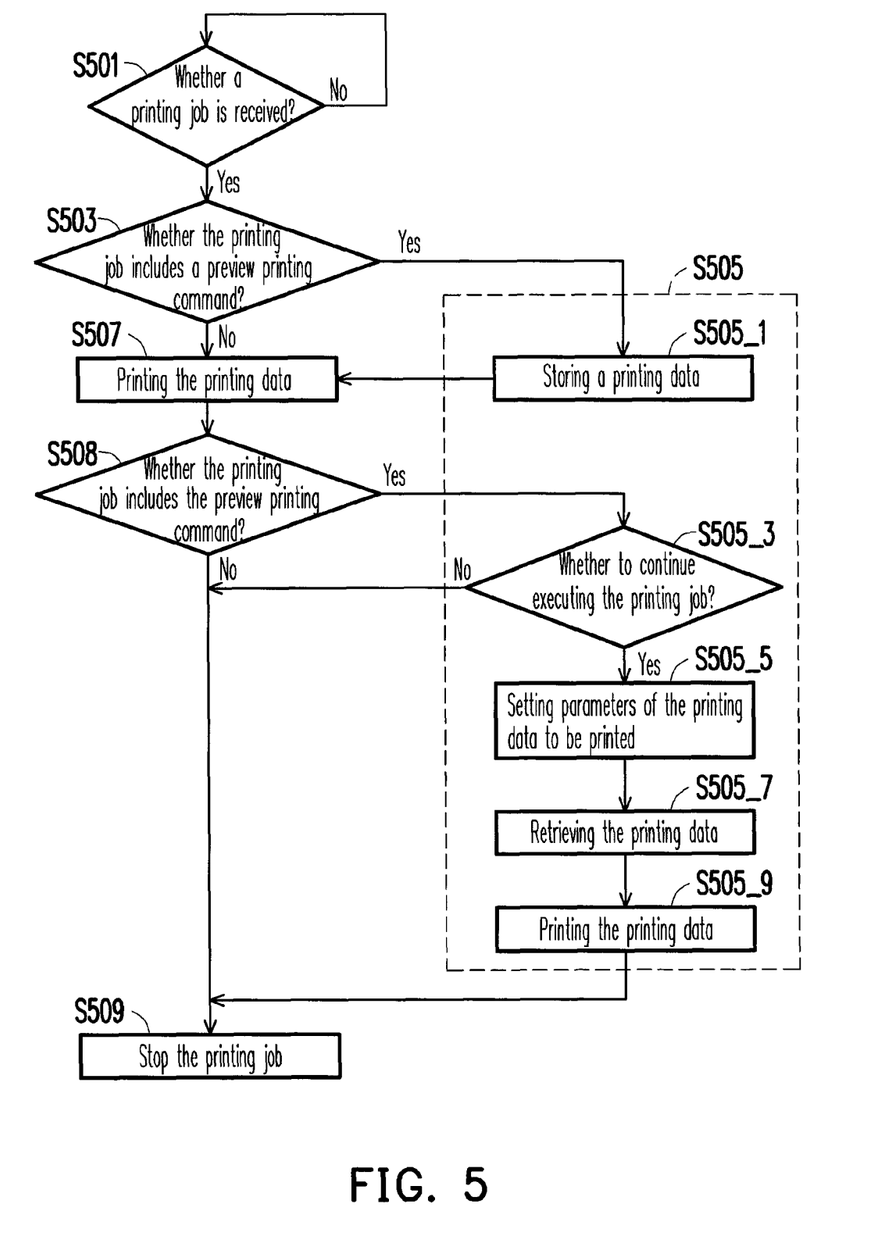
FIG. 5 is a flowchart illustrating a method for previewing printing suitable for a printing apparatus according to an embodiment of the invention.

The computer device 100 and the printing apparatus 200 are connected to each other via a universal serial bus (USB) or a network connection interface, which should not be construed as a limitation to the invention. Namely, other buses including a parallel bus can also be applied to connect the computer device 100 to the printing apparatus 200. An embodiment is provided hereinafter to elaborate the detailed steps of the method for previewing printing in the invention. FIG. 5 is a flowchart illustrating a method for previewing printing suitable for a printing apparatus according to an embodiment of the invention. With reference to FIG. 4 and FIG. 5 together, in step S501, the I/O module 410 of the printing apparatus 40 continuously determines whether the printing job transmitted by the computer device 100 is received. When the I/O module 410 determines receipt of the printing job, the printing apparatus 40 starts the printing job and performs setting based on the printing command. The printing apparatus 40 then performs step S503. The parser module 440 analyzes the language to determine whether the printing job includes the preview printing command, e.g., @PJL SET PREVIEW=ON, so as to enable the preview printing function and recognize the user's identification code. Namely, whether the command file 30 in the printing job transmitted by the computer device 100 includes the preview printing command is determined. When the parser module 440 determines that the printing job does not include the preview printing command, step S507 is performed to transmit the printing data to the printing module 420, and the printing module 420 prints the printing data in a shipping-page manner.

If the parser module 440 determines that the printing job includes the preview printing command, step S505 is performed to execute preview printing. The printing data is then stored in the storage module 430 (step S505_1), and the printing module 420 prints the printing data (step S507). Whether the printing job includes the preview printing command is determined in step S508. When the user confirms the quality of the printing data printed by the printing module 420, and the printing job is determined to include the preview printing command, whether to continue executing the printing job is determined in step S505_3. If the user decides not to continue execution of the printing job and cancels the printing job because of unfavorable quality of the printing data printed by the printing module 420 or because of errors in the printing data printed by the printing module 420, step S509 is performed, i.e., the printing apparatus 40 stops executing the printing job.

If the user determines to continue execution of the printing job, step S505_5 is performed to set parameters of the printing data on a panel 411 of the I/O module 410. Here, the parameters include the number of copies, color density, or a margin of the printing data and can be spontaneously adjusted by a printer. Based on the user's requirement, if it is not necessary to set the printing data which is going to be further printed, e.g., the driver 20 of the computer device 100 already determines the number of copies, the step S5055 can be omitted, and the step S5057 can be directly performed. The printing apparatus 40 then reads the printing data from the storage module 430 in step S505_7 and transmits the printing data to the printing module 420, and the printing module 420 prints the printing data (step S505_9). After that, step S509 is performed, i.e., the printing apparatus 40 stops the printing job.

Figure 6:
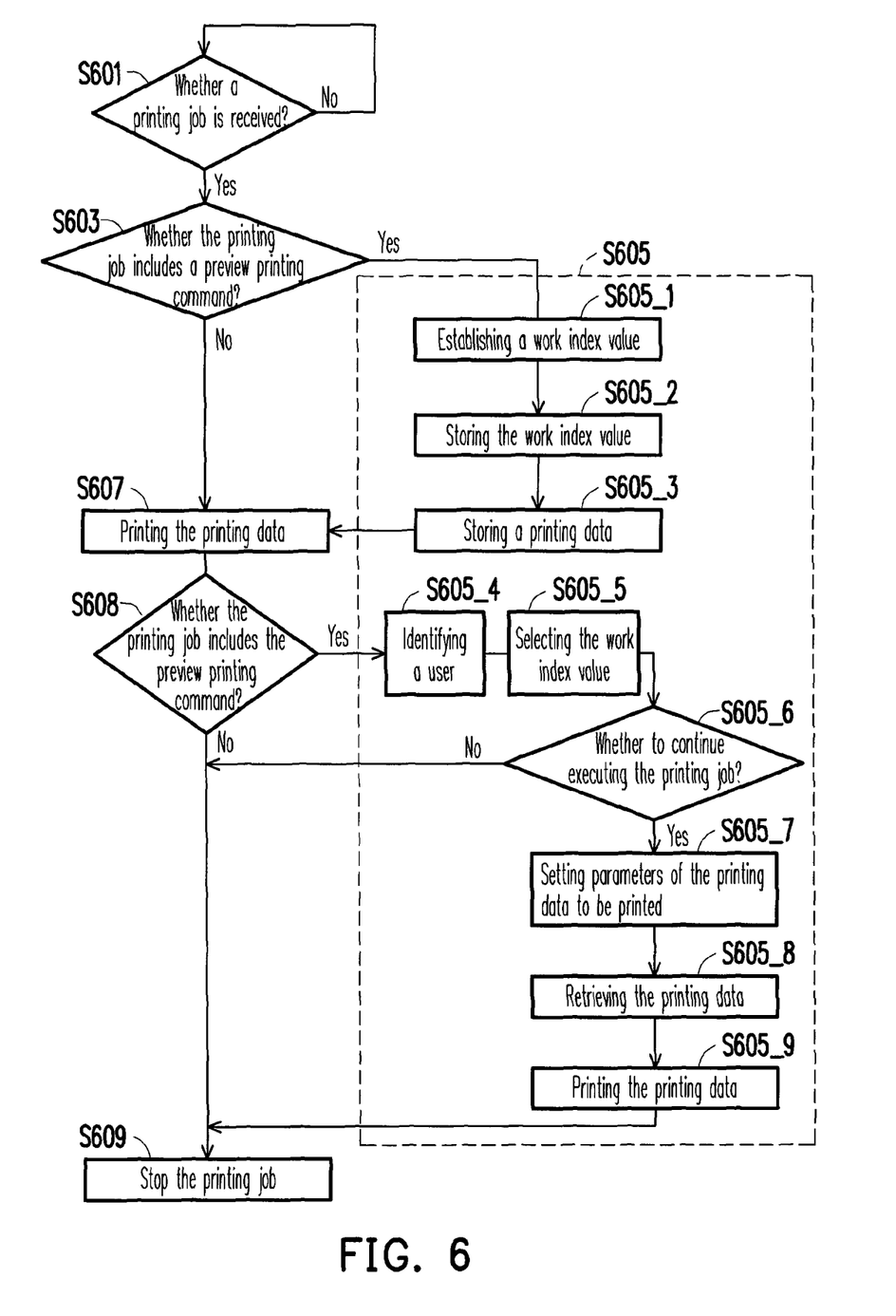
FIG. 6 is a flowchart illustrating a method for previewing printing suitable for a printing apparatus according to another embodiment of the invention.

In another embodiment of the invention, the printing apparatus 40 further includes an identification module 450 that can identify a user based on identification information stored in the printing apparatus 40. FIG. 6 is a flowchart illustrating a method for previewing printing suitable for a printing apparatus according to another embodiment of the invention. With reference to FIG. 4 and FIG. 6 together, when computer devices 100 correspond to multiple users, the printing apparatus 40 having the identification mechanism can accomplish multiple functions and also ensure user identify confidentiality. In step S601, the I/O module 410 of the printing apparatus 40 continuously determines whether the printing job transmitted by the computer device 100 is received. When the I/O module 410 determines receipt of the printing job, the printing apparatus 40 starts the printing job and performs setting based on the printing command. The printing apparatus 40 then performs step S603. The parser module 440 analyzes the language to determine whether the printing job includes the preview printing command, e.g., @PJL SET PREVIEW=ON, so as to enable the preview printing function and recognize the user's identification code. Namely, whether the command file 30 in the printing job transmitted by the computer device 100 includes the preview printing command is determined. When the parser module 440 determines that the printing job does not include the preview printing command, step S607 is performed to transmit the printing data to the printing module 420, and the printing module 420 prints the printing data in a shipping-page manner.

Figure 7:
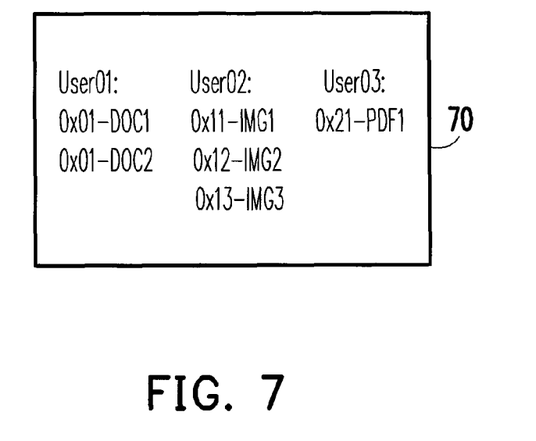
FIG. 7 is a schematic view illustrating a work index table stored in a storage module according to an embodiment of the invention.

If the parser module 440 determines that the printing job includes the preview printing command, step S605 is performed to execute preview printing. The printing apparatus 40 then establishes a work index value associated with the printing job in step S605_1, and the work index value corresponds to individual user. The user can index the printing data based on the work index value and stores the work index value into a work index table 70 in the storage module 430 (step S605_2). The work index table 70 records file names and file types of the printing data transmitted by the users, as shown in FIG. 7, and the printing data is stored into the storage module 430 in step S605_3. After the printing data is stored, the printing module 420 prints the printing data in step S607. Whether the printing job includes the preview printing command is determined by the printing module 420 in step S608. When the user confirms the quality of the printing data printed by the printing module 420, and when the printing job is determined to include the preview printing command, the identification module 450 identifies the user. The identification module 450 has a built-in database, and the database records a plurality of stock identification information and compares the identification information with the stock identification information to determine whether the identification information matches any of the stock identification information. Thereby, the printing data can be efficiently accessed and secured. When the identification information refers to a password, the password may be an employee's identification code or number; when the identification information refers to a biometric data, the biometric data may include a fingerprint, a facial feature, or radio frequency identification (RFID) (step S605_4). The required work index value is selected from the work index table 70 according to the user in step S605_5. The printing apparatus 40 determines whether to continue executing the printing job in step S605_6. If the user decides not to continue execution of the printing job and cancels the printing job because of unfavorable quality of the printing data printed by the printing module 420 or because of errors in the printing data printed by the printing module 420, step S609 is performed, i.e., the printing apparatus 40 stops executing the printing job.

If the user determines to continue execution of the printing job, step S605_7 is performed to set parameters of the printing data on the panel 411 of the I/O module 410. Here, the parameters include the number of copies, color density, or a margin of the printing data and can be spontaneously adjusted by a printer. Based on the user's requirement, if it is not necessary to set the printing data which is going to be further printed, e.g., the driver 20 of the computer device 100 already determines the number of copies, the step S605_7 can be omitted, and the step S605_8 can be directly performed. The printing apparatus 40 then reads the printing data from the storage module 430 based on the selected work index value (step S605_8) and transmits the printing data to the printing module 420, and the printing module 420 prints the printing data (step S605_9). After that, step S609 is performed, i.e., the printing apparatus 40 stops the printing job.

Figure 8:
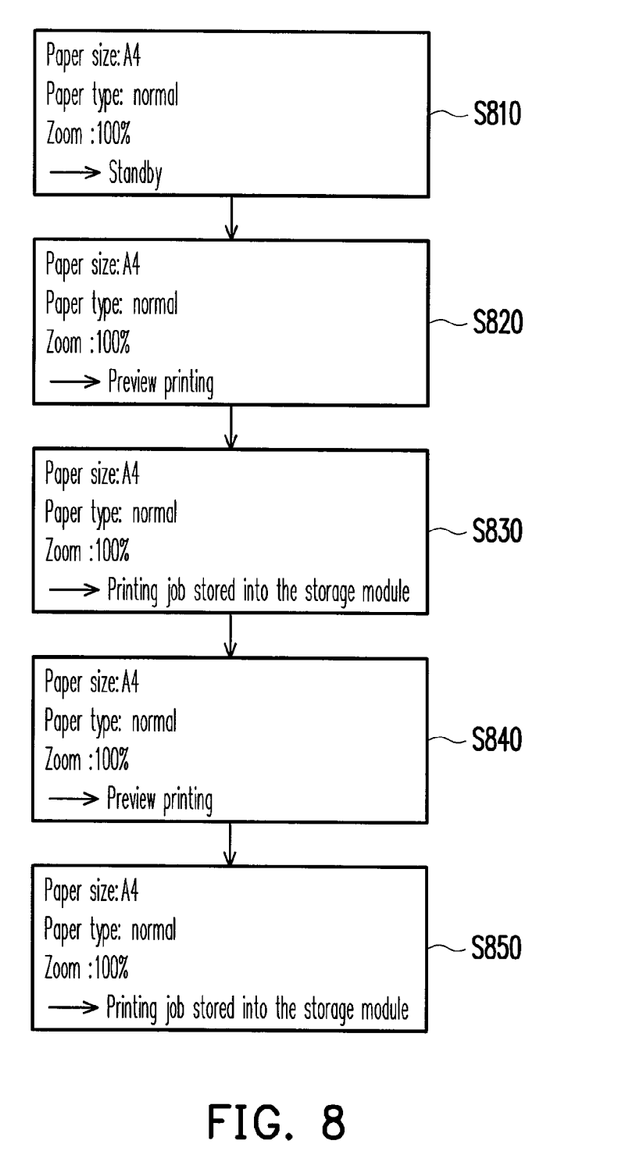
FIG. 8 is a first flowchart illustrating operation of a panel according to an embodiment of the invention.

In this embodiment, the panel 411 of the I/O module 410 shows the printing apparatus 40 executing the printing job. A flowchart of operating the panel 411 is provided and described in the following exemplary embodiments. FIG. 8 is a first flowchart illustrating operation of the panel 411 according to an embodiment of the invention. With reference to FIG. 8, when the printing apparatus 40 is in a standby state, the panel 411 shows "standby" (step S810). When the printing apparatus 40 receives the printing data 1 and the printing data 2 of the printing job transmitted by the first user, the panel 411 shows "preview printing" (step S820). After the printing apparatus 40 prints the printing data 1 and the printing data 2 of the printing job transmitted by the first user, the panel 411 shows that the printing job is stored into the storage module 430 (step S830). When the printing apparatus 40 receives a report of the printing job transmitted by the second user, the panel 411 shows "preview printing" (step S840). After the printing apparatus 40 prints the printing data of the printing job transmitted by the second user, the panel 411 shows that the printing job is stored into the storage module 430 (step S850).

Figure 9:
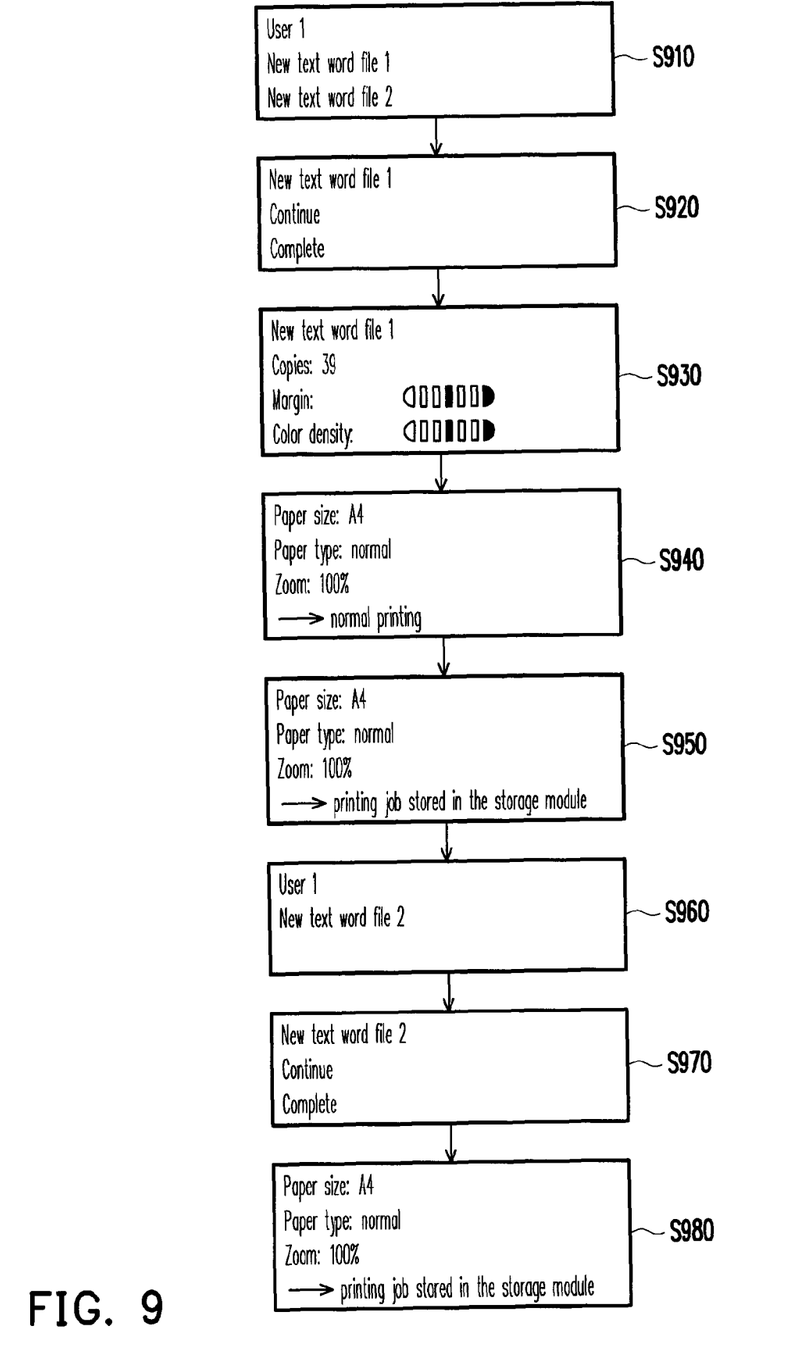
FIG. 9 is a second flowchart illustrating operation of a panel according to an embodiment of the invention.

FIG. 9 is a second flowchart illustrating operation of the panel 411 according to an embodiment of the invention. With reference to FIG. 9, when the first user confirms that a new text word file 1 contains no error, and the first user is identified by means of the identification module 450, the first user accesses to his or her work index table 70, selects the new text word file 1 (step S910), and further sets parameters for further printing (step S920). In step S930, the number of copies of the new text word file 1 is set as 39, for instance, and the margin and the color density are also set. The printing module 420 then initiates the normal printing of the new text word file 1 in step S940. After the new text word file 1 is printed, the panel 411 again shows the main screen and indicates that the printing job is stored into the storage module 430 (step S950). When the first user confirms that a new text word file 2 contains errors, and the first user is further identified by means of the identification module 450, the first user accesses to his or her work index table 70, selects the new text word file 2 (step S960), and selects "completion" to cancel the printing job (step S970). After the printing apparatus 40 prints the printing data of the printing job transmitted by the first user, the panel 411 shows that the printing job is stored into the storage module 430 (step S980).

Figure 10:
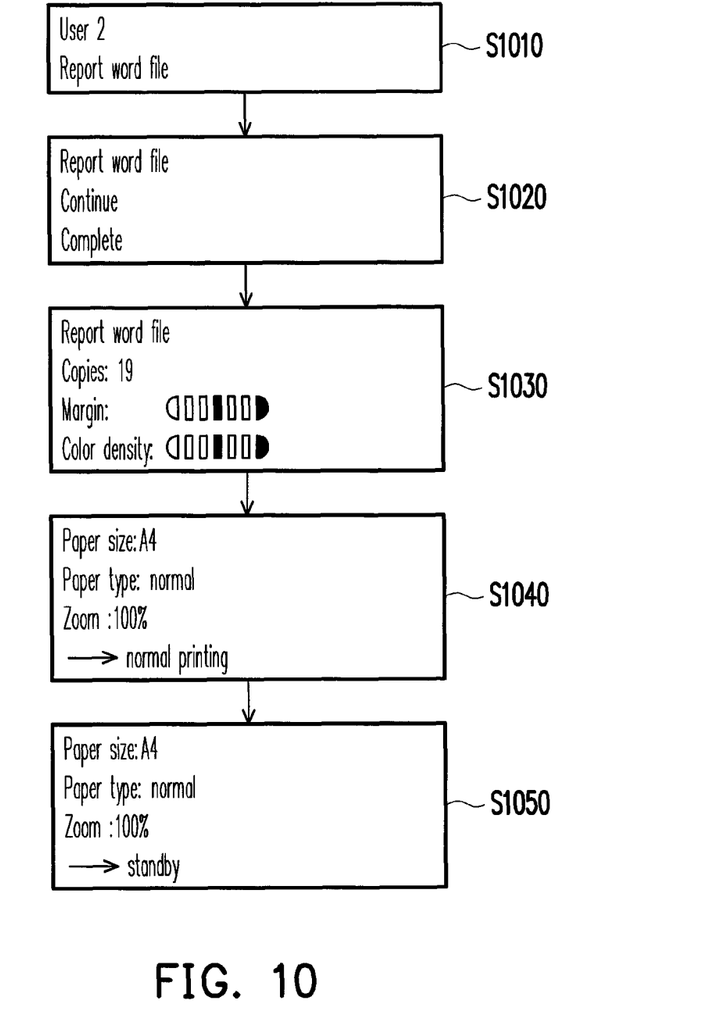
FIG. 10 is a third flowchart illustrating operation of a panel according to an embodiment of the invention.

FIG. 10 is a third flowchart illustrating operation of the panel 411 according to an embodiment of the invention. With reference to FIG. 10, when the second user confirms that a report word file contains no error, and the second user is identified by means of the identification module 450, the second user accesses to his or her work index table 70, selects the report word file (step S1010), and further sets parameters for further printing (step S1020). In step S1030, the number of copies of the report word file is set as 19, for instance, and the margin and the color density are also set. The printing module 420 then initiates the normal printing of the report word file in step S1040. After the report word file is printed, the panel 411 again shows the main screen and indicates "standby" (step S1050).

The embodiments above serve to explain the concept of the invention rather than limit the scope of the invention.

In light of the foregoing, since the printing apparatus is capable of temporarily storing document, an additional mechanism of retaining the to-be-confirmed document is developed in the invention. The printing apparatus receives the printing job. When the printing job is determined to include the preview printing command, the printing apparatus stores the printing data and prints the printing data. After the user confirms the quality of the printing data which is printed, and when the user determines to continue executing the printing job, the user may set printing parameters via the panel of the I/O module in order to continue to print the printing data. Thereby, the printing apparatus can be equipped with the actual preview printing function and allows the user to check the watermark of the printing data or confirm the printing quality while he or she is beside the printing apparatus. As such, the issue that the watermark cannot be displayed on the screen can be resolved, and the user is no longer burdened with the repetitive actions of standing around the printing apparatus to confirm the quality of the printed document and then moving back to the computer to perform setting at the computer end for printing more documents. Moreover, the applications of the invention can be extended by the identification module that can identify users, so as to accomplish multiple functions and ensure user identity confidentiality.

It will be apparent to those skilled in the art that various modifications and variations can be made to the structure of the disclosure without departing from the scope or spirit of the invention. In view of the foregoing, it is intended that the disclosure cover modifications and variations of this disclosure provided they fall within the scope of the following claims and their equivalents.

What is claimed is:

1. A method for previewing printing, the method being suitable for a printing apparatus and comprising:
   receiving a printing job, the printing job comprising a printing data;
   determining whether the printing job comprises a preview printing command;
   when the printing job is determined to comprise the preview printing command:
      storing the printing data;
      establishing a work index value for indexing the printing data according to a user; and
      storing the work index value into a work index table,
   printing the printing data;
   after the printing job is printed, and when the printing job is determined to comprise the preview printing command, the method further comprising:

identifying the user;

selecting the work index value from the work index table according to the user; and retrieving the printing data based on the work index value; and when the printing job is determined to comprise the preview printing command:

determining whether to continue executing the printing job; and when it is determined to continue executing the printing job, continuing to print the printing data.

2. The method as recited in claim 1, wherein the user is identified based on identification information.

3. The method as recited in claim 2, wherein the identification information is a password, a biometric data, or wireless information.

4. The method as recited in claim 1, wherein before continuing to print the printing data, the method further comprises:

setting the number of copies, color density, or a margin of the printing data.

5. The method as recited in claim 1, wherein the step of selecting the work index value from the work index table comprises:

the user selecting the work index value via a panel of an input/output module.

6. The method as recited in claim 1, wherein the printing data is a word file, an image file, or an excel file.

7. A printing apparatus for previewing printing, comprising:

an input/output module for receiving a printing job, the printing job comprising a printing data;

a printing module for printing the printing data;

a storage module for storing the printing data;

a parser module for determining whether the printing job comprises a preview printing command, wherein when the printing job is determined to comprise the preview printing command, the printing apparatus stores the printing data, after the printing module prints the printing data, the printing apparatus determines whether to continue executing the printing job, and when it is determined to continue executing the printing job, the printing apparatus continues to print the printing data; and an identification module for identifying a user based on identification information, wherein when the printing job is determined to comprise the preview printing command, the printing apparatus establishes a work index value according to the user and stores the work index value into a work index table in the storage module, the work index value is capable of indexing the printing data, and when the printing data is printed by the printing module and the printing job is determined to comprise the preview printing command, the identification module identifies the user, the printing apparatus selects the work index value from the work index table according to the user, and reads the printing data based on the work index value.

8. The printing apparatus as recited in claim 7, wherein the identification module has a built-in database, and the database records a plurality of stock identification information and compares the identification information with the stock identification information to determine whether the identification information matches any of the stock identification information.

9. The printing apparatus as recited in claim 8, wherein the identification information is a password, a biometric data, or wireless information.

10. The printing apparatus as recited in claim 7, wherein the printing apparatus sets the number of copies, color density, or a margin of the printing data before the printing module continues to print the printing data.

11. The printing apparatus as recited in claim 7, wherein the input/output module receives the printing job via a universal serial bus or a network.

12. The printing apparatus as recited in claim 7, wherein the printing data is a word file, an image file, or an excel file.

13. A system for previewing printing, comprising:

a computer device, a driver being installed in the computer device and issuing a preview printing command, the computer device transmitting a printing job, the printing job comprising a printing data and the preview printing command;

a printing apparatus comprising:

an input/output module for receiving the printing job;

a printing module for printing the printing data;

a storage module for storing the printing data; and a parser module for determining whether the printing job comprises the preview printing command, wherein when the printing job is determined to comprise the preview printing command, the printing apparatus stores the printing data, after the printing module prints the printing data, the printing apparatus determines whether to continue executing the printing job, and when it is determined to continue executing the printing job, the printing apparatus continues to print the printing data; and an identification module for identifying a user based on identification information, wherein when the printing job comprises the preview printing command, the printing apparatus establishes a work index value according to the user and stores the work index value into a work index table in the storage module, the work index value is capable of indexing the printing data, and when the printing data is printed by the printing module and the printing job is determined to comprise the preview printing command, the identification module identifies the user, the printing apparatus selects the work index value from the work index table according to the user, and reads the printing data based on the work index value.

14. The system as recited in claim 13, wherein the identification module has a built-in database, and the database records a plurality of stock identification information and compares the identification information with the stock identification information to determine whether the identification information matches any of the stock identification information.

15. The system as recited in claim 13, wherein the printing apparatus sets the number of copies, color density, or a margin of the printing data before the printing module continues to print the printing data.

* * * * *